(12) United States Patent
Gilje

(10) Patent No.: US 8,317,984 B2
(45) Date of Patent: Nov. 27, 2012

(54) GRAPHENE OXIDE DEOXYGENATION

(75) Inventor: S Scott Gilje, Los Angeles, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 674 days.

(21) Appl. No.: 12/386,303

(22) Filed: Apr. 16, 2009

(65) Prior Publication Data

US 2010/0266964 A1 Oct. 21, 2010

(51) Int. Cl.
*C01B 31/02* (2006.01)
*G03F 7/20* (2006.01)
(52) U.S. Cl. .................................. 204/157.47; 430/322
(58) Field of Classification Search .................. 430/322; 204/157.47
See application file for complete search history.

(56) References Cited

U.S. PATENT DOCUMENTS

| | | | |
|---|---|---|---|
| 2,798,878 A | 7/1957 | Hummers, Jr., et al. | |
| 6,869,581 B2 | 3/2005 | Kishi et al. | |
| 7,001,581 B2 | 2/2006 | Kawakami et al. | |
| 7,071,258 B1 | 7/2006 | Jang et al. | |
| 7,105,108 B2 | 9/2006 | Kaschak et al. | |
| 7,214,430 B2 | 5/2007 | Handa et al. | |
| 7,217,404 B2 | 5/2007 | Ajayan et al. | |
| 7,381,352 B2 | 6/2008 | Gotou | |
| 2001/0001703 A1* | 5/2001 | Takahashi et al. | 430/322 |
| 2006/0121279 A1 | 6/2006 | Petrik | |
| 2008/0206124 A1 | 8/2008 | Jang et al. | |
| 2009/0236609 A1* | 9/2009 | de Heer et al. | 257/77 |
| 2010/0144904 A1* | 6/2010 | Wang et al. | 516/98 |
| 2011/0049437 A1* | 3/2011 | Crain et al. | 252/511 |

OTHER PUBLICATIONS

Williams, Graeme et al., "TiO2-Graphene Nanocomposites. UV-Assisted Photocatalytic Reduction of Graphene Oxide," ACS Nano, vol. 2, No. 7, 1487-1491, 2008.*
Huang, Jiaxing et al; Flash Welding of Conducting Polymer Nanofibres; Nature Materials; Nature Nanotechnology; 2004, pp. 783-786; vol. 3; Nature Publishing Group; Published online: Oct. 24, 2004; doi:10.1038/nmat1242.
Wang, N. et al; Enhanced Photothermal Effect in Si Nanowires; Nano Letters; 2003; pp. 475-477; vol. 3, No. 4; 2003 American Chemical Society; Published on Web Mar. 6, 2003 10.1021/nl034019m.
Dikin, Dmitriy A. et al; Preparation and Characterization of Graphene Oxide Paper; Nature 2007; Jul. 2007; pp. 457-460; vol. 448; Nature Publishing Group; doi:10.1038/nature06016.
Stankovich, Sasha et al; Synthesis of Graphene-Based Nanosheets via Chemical Reduction of Exfoliated Graphite Oxide; Carbon 2007; pp. 1558-1565; vol. 45; ScienceDirect; Elsevier Ltd.; doi:10.1016/j.carbon.2007.02.034.
Tung, V.C. et al; High-Throughput Solution Processing of Large-Scale Graphene; Nature Nanotechnology Letters; 2009; pp. 25-29; vol. 4; Macmillian Publishers 2009; Published online: Nov. 9, 2009; doi:10.1038/nnano.2008.329.
Li, Dan et al; Processable Aqueous Dispersions of Graphene Nanosheets; Nature Nanotechnology; Feb. 2008; pp. 101-105; vol. 3; Nature Publishing Group; Published online: Jan. 27, 2008; doi:10.1038/nnano.2007.451.

(Continued)

*Primary Examiner* — Cynthia Kelly
*Assistant Examiner* — Brittany Raymond
(74) *Attorney, Agent, or Firm* — Carmen Patti Law Group, LLC

(57) ABSTRACT

A graphene oxide (GO) target is exposed to light having power sufficient to initiate a deoxygenation reaction of the GO target. The deoxygenation reaction of the GO target transforms the GO target to graphene.

14 Claims, 6 Drawing Sheets

OTHER PUBLICATIONS

Park, Sungjin et al; Aqueous Suspension and Characterization of Chemically Modified Graphene Sheets; Chemistry of Materials; 2008; pp. 6592-6594; vol. 20; American Chemical Society; Washington, DC; USA; Published on Web Oct. 23, 2008; doi:10.1021/cm801932u.

Gomez-Navarro, C. et al; Electric Transport Properties of Individual Chemically Reduced Graphene Oxide Sheets; Nano Letters; 2007; vol. 7 No. 11; pp. 3499-3503; American Chemical Society; USA; Published on Web Oct. 18, 2007; 10.1021/nl072090c.

Chen, Haiqun et al; Mechanically Strong, Electrically Conductive, and Biocompatible Graphene Paper; Advanced Materials; 2008; pp. 1-5; vol. 9999; 2008 Wiley-VCH Verlag GmbH & Co. KGaA, Weinheim; doi:10.1002/adma.200800757.

Arsat, R. et al; Graphene-like Nano-Sheets for Surface Acoustic Wave Gase Sensor Applications; Chemical Physics Letters; 2008; pp. 344-347; vol. 467; Elsevier B. V.; doi:10.1016/j.cplett.2008.11.039.

Stoller, Meryl D. et al; Graphene-Based Ultracapacitors; Nano Letters; 2008; pp. 3498-3502; vol. 8, No. 10; American Chemical Society; Published on Web Sep. 13, 2008; doi 10.1021/nl802558y.

Cote, Laura J. et al; Langmuir-Blodgett Assembly of Graphite Oxide Single Layers; Ja. Am. Chem. Soc. Articles; 2009; pp. 1043-1049; vol. 131, No. 3; American Chemical Society; USA; Published online Oct. 22, 2008 10.1021/ja806262m.

Goki, E. et al; Transparent and Conducting Electrodes for Organic Electronics from Reduced Graphene Oxide; Applied Physics Letters; 2008; vol. 92; 233305; American Institute of Physics; USA.

Wang, X. et al; Transparent Carbon Films as Electrodes in Organic Solar Cells; Angew. Chem. Int. Ed.; 2008; pp. 2990-2992; vol. 47; Wiley-VCH Verlag GmbH & Co. KGaA, Weinheim; doi: 10.1002/anie.200704909.

Wu, J. et al; Organic Solar Cells with Solution-processed Graphene Transparent Electrodes; Applied Physics Letters; 2008; vol. 92; 263302-1; American Institute of Physics; USA.

Goki, E. et al; Large-area Ultrathin Films of Reduced Graphene Oxide as a Transparent and Flexible Electronic Material; Nature Nanotechnology; 2008; pp. 270-274; vol. 3, May 2008; Nature Publishing Group; Published online Apr. 6, 2008; doi 10.1038/nnano.2008.83.

Li, Xiaolin et al; Highly Conducting Graphene Sheets and Langmuir-Blodgett Films; Nature Nanotechnology; 2008; pp. 538-542; vol. 3; Macmillan Publishers Limited; USA; Published onlin: Aug. 1, 2008; doi:10.1038/nnano.2008.210.

Braidy; Nadi et al; Oxidation of Fe Nanoparticles Embedded in Single-Walled Carbon Nanotubes by Exposure to a Bright Flash of White Light; Nano Letters; 2002; vol. 2, No. 11; pp. 1277-1280; American Chemical Society; USA; Published on web Oct. 1, 2002; doi 10.1021/nl025718m.

Smits, Jan et al; Response of Fe Powder, Purified and as-Produced HiPco Single-Walled Carbon Nanotubes to Flash Exposure; Materials Science Engineering A358; 2003; pp. 384-389; Elsevier Science B.V.; doi: 10.1016/S0921-5093(03) 00282-X.

Chiang, I.W. et al; Purification and Characterization of Single-Wall Carbon Nanotubes (SWNTs) Obtained from the Gas-Hase Decomposition of CO (HiPco Process); J. Phys. Chem. B; 2001; pp. 8297-8301; vol. 105; American Chemical Society; USA; Published on Web Aug. 10, 2001; doi:10.1021/jp0114891.

Gilje, Scott et al; A Chemical Route to Graphene fore Device Applications; Nano Letters; 2007; pp. 3394-3398; vol. 7, No. 11; American Chemical Society; USA; Published on Web Oct. 18, 2007; doi:10.1021/nl0717715.

Williams, Graeme et al;TiO2-Graphene Nanocomposites. UV-Assisted Photocatalytic Reduction of Graphene Oxide; ACS Nano; Jun. 17, 2008; vol. XXX, No. XX; pp. A-E; American Chemical Society; Published online Jul. 3, 2008 10.1021/nn800251F CCC.

Berger, Claire et al; Ultrathiin Epitaxial Graphite: 2D Electron Gas Properties and a Route Toward Graphene-based Nanoelectronics; J. Phys. Chem B.; Oct. 7, 2004; pp. 19912-19916; vol. 108, No. 52; School of Physics, Georgia Institute of Technology, Atlanta, GA; American Chemical Society; Published on Web Dec. 3, 2004.

Wang, Xuan et al; Transparent, Conductive Graphene Electrodes for Dye-Sensitized Solar Cells; Nano Letters; 2008; pp. 323-327; vol. 8, No. 1; American Chemical Society; Published online Dec. 11, 2007 10.1021/nl072838r CCC.

Hirata, Masukazu et al; Thin-Film Particles of Graphite Oxide 1: High Yield Synthesis and Flexibility of the Particles; Elsevier Carbon 42; 2004; pp. 2929-2937; doi:10.1016/j.carbon.2004.07.003; Elsevier Ltd.

Stankovich, Sasha et al.; Synthesis and Exfoliation of Isocyanate-Treated Graphene Oxide Nanoplatelets; Elsevier Carbon 44; 2006; pp. 3342-3347; doi:10.1016/j.carbon.2006.06.004; Elsevier Ltd.

Zhang, Rui et al; Preparation and Combustion Properties of Flame Retardant Styrene-Butyl Acrylate Copolymer/Graphite Oxide Nanocomposites; Marcromolecular Materials and Engineering; 2004; pp. 355-359; 2004 Wiley-VCH;Verlag GmbH & Co. KGAA, Weinheim; DOI: 10.1002/mame.200300264.

Lerf, Anton et al; Structure of Graphite Oxide Revisited; J. Phys. Chem. B. 1998, vol. 102; No. 23; 1998; pp. 4477-4482; 1998 American Chemical Society; Published on Web May 13, 1998; S1089-5647(97)03182-9 CCC.

Stankovich, Sasha et al.; Graphene-Based Composite Materials; Nature; Jul. 20, 2006; pp. 282-286; vol. 442; Nature Publishing Group; doi:10.1038/nature 04969.

Stankovich, Sasha et al; Stable Aqueous Dispersions of Graphitic Nanoplatelets Via the Reduction of Exfoliated Graphite Oxide in the Presence of Poly(sodium 4-styrenesulfonate Journal of Materials Chemistry; 2006; pp. 155-158; The Royal Society of Chemistry; DOI: 10.1039/b512799h.

McAllister, Michael J.; Single Sheet Functionalized Graphene by Oxidation and Thermal Expansion of Graphite; Chemical Materials; 2007; vol. 19, No. 18; pp. 4396-4404; American Chemical Society 2007; Published on Web May 25, 2007; 10.1021/cm0630800 CCC.

Jung, Inhwa et al; Simple Approach for High-Contrast Optical Imaging and Characterization of Graphene-Based Sheets; Nano Letters; 2007; pp. 3569-3575; vol. 7, No. 12, American Chemical Society; Published on the Web Nov. 2, 2007; 10.1021/nl0714177 CCC.

Kudin, Konstantin et al; Raman Spectra of Graphite Oxide and Functionalized Graphene Sheets; Nano Letters; 2008; pp. 36-41; vol. 8, No. 1; American Chemical Society; Published on Web Dec. 22, 2007; 10.1021/nl071822y CCC.

Li, Je-Luen et al; Oxygen-Driven Unzipping of Graphitic Materials; Physical Review Letters; 2006; pp. 176101-1 thru 176101-4; vol. 96; The American Physical Society.

Herrera-Alonso, Margarita et al; Intercalation and Stitching of Graphite Oxide with Diaminoalkanes; Langmuir; 2007; pp. 10644-10649; vol. 23, No. 21; American Chemical Society; Published on Web Sep. 7, 2007; 10.1021/la0633839 CCC.

Watcharotone, Supinda et al; Graphene-Silica Composite Thin Films as Transparent Conductors; Nano Letters; 2007; pp. 1888-1892; vol. 7, No. 7; Published on Web Jun. 26, 2007; American Chemical Society; 10.1021/nl070477+CCC.

Watcharotone, Supinda et al; Supporting Information to Accompany:Graphene-Silica Composite Thin Films; Nano Letters; 2007; pp. 1-7; vol. 7, No. 7; Published on Web Jun. 26, 2007; American Chemical Society; 10.1021/nl070477+CCC.

Ramanathan, T. et al; Functionalized Graphene Sheets for Polymer Nanocomposites; Nature Nanotechnology; vol. 3 No. 6, pp. 327-331 (1-5); Published online May 11, 2008; Nature Publishing Group; doi:10.1038/nnano.2008.96.

Gomez-Navarro, Cristina et al; Elastic Properties of Chemically Derived Single Graphene Sheets; Nano Letters; 2008; pp. A-E; vol. xx, No. x; Published on Web Jun. 10, 2008; XXXX American Chemical Society; 10.1021/nl801384y CCC.

Park, Sungjin et al; Graphene Oxide Papers Modified by Divalent Ions-Enhancing Mechanical Properties via Chemical Cross-linking; ACS Nano; 2008; pp. 572-578; vol. 2, No. 3, Published online Mar. 6, 2008; 10.1021/nn700349a CCC American Chemical Society.

Schniepp, Hannes C. et al; Functionalized Single Graphene Sheets Derived from Splitting Graphite Oxide; The Journal of Physical Chemistry B Letters; 2006; pp. 8535-8539; vol. 110; Published on Web Apr. 11, 2006; American Chemical Society; 10.1021/jp060936f CCC.

Szabo, Tamas et al; Evolution of Surface Functional Groups in a Series of Progressively Oxidized Graphite Oxides; Chemical Materials; 2006; pp. A-J; American Chemical Society; Published on Web May 4, 2006; p. Est: 9.8; 10.1021/cm060258+ CCC.

Jeong, Hae-Kyung et al; Evidence of Graphitic AB Stacking Order of Graphite Oxides; J. AM. Chemcial Society Articles; 2008; pp. A-E; American Chemical Society; Published on Web Jan. 8, 2008; p. Est: 4.8; 10.1021/ja076473o CCC.

Hong, Seunghyun et al; Dielectrophoretic Deposition of Graphite Oxide Soot Particles; Journal of Nanoscience and Nanotechnology; 2008; pp. 424-427; vol. 8; No. 1; American Scientific Publishers; USA.

Hahn, Jungseok et al; Deposition of Cationic Polymer Micelles on Planar SiO2 Surfaces; Langmuir; 2004, pp. 4211-4219; vol. 20, No. 10; American Chemical Society; Published on Web Mar. 13, 2004; 10.1021/la035819f CCC.

Jung, Inhwa et al; Characterization of Thermally Reduced Graphene Oxide by Imaging Ellipsometry; The Journal of Physical Chemistry Letters; 2008; pp. 8499-8506 vol. 112, No. 23; American Chemical Society; Published on Web May 16, 2008; 10.1021/jp8002173m CCC.

Kotov, Nicholas A.; Carbon Sheet Solutions; News and Views Nature; Jul. 2006; pp. 254-255; vol. 442, No. 20; Nature Publishing Group.

Seredych, Mykola et al; Removal of Ammonia by Graphite Oxide Via its Intercalation and Reactive Adsorption; Letter to the Editor/Carbon 45; 2007; pp. 2130-2132; Elsevier Ltd.; doi:10.1016/j.carbon.2007.06.007.

He, Heyong et al; A New Structural Model for Graphite Oxide; Chemical Physics Letters 287; Apr. 28, 1998; pp. 53-56; Elsevier Science B.V.

Ajayan, P.M. et al; Nanotubes in a Flash-Ignition and Reconstruction; Science Mag; p. 705; vol. 296; Apr. 2002.

Carbon Nanotubes Burn when Flashed—Chemistry Brief Article; Science News; May 25, 2002; 2 Pages; Science Service, Inc. 2002.

Pennicott, Katie; Nanotubes Reach Flash Point; Physicsworld.com; physicsworld.com/cws/article/news/5382; 1 page.

Becerril, Hector A. et al; Evaluation of Solution-Processed Reduced Graphene Oxide Films as Transparent Conductors; Graphene Literature Reviews; 2008; 1 Page; ACS Nano 2008; DOI 10.1021/nn700375n.

Huber, Trisha A.; Polymer-Carbon Nanotube Composites A Literature Review; Defence R&D Canada—Atlantic 2004-091; Aug. 2004; 47 Pages; Her Majesty the Queen as represented by the Minister of National Defence, 2004; Defence R&D Canada.

Chehroudi, B. et al; A Novel Distributed Ignition Method Using Single-Wall Carbon Nanotubes (SWCNTS) and a Low-Power Flash Light; Global Powertrain Congress World Powertrain Exposition; Novi, Michigan; Sep. 19-21, 2006; pp. 1-8.

* cited by examiner

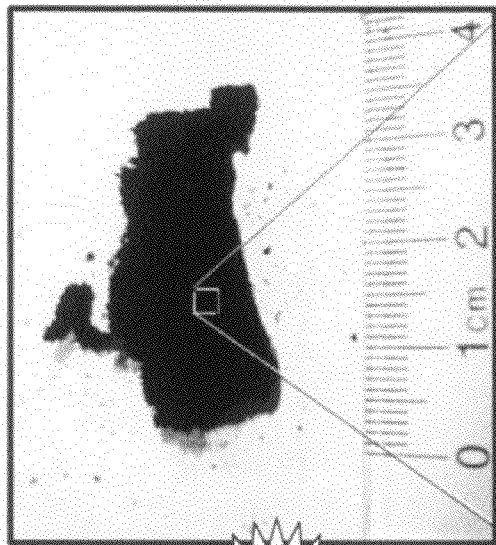
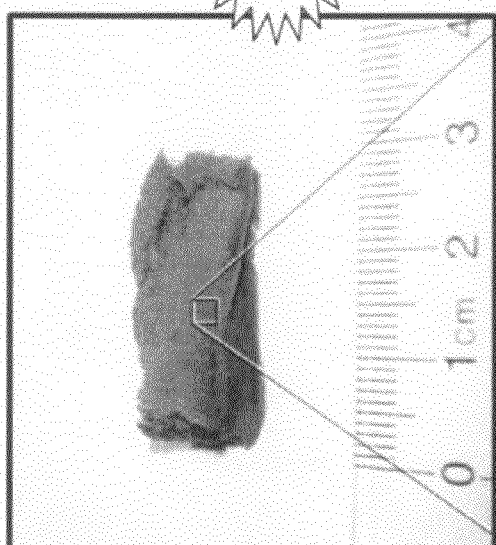
FIG. 3A
FIG. 3B
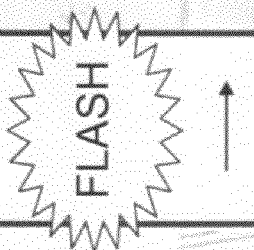
FLASH
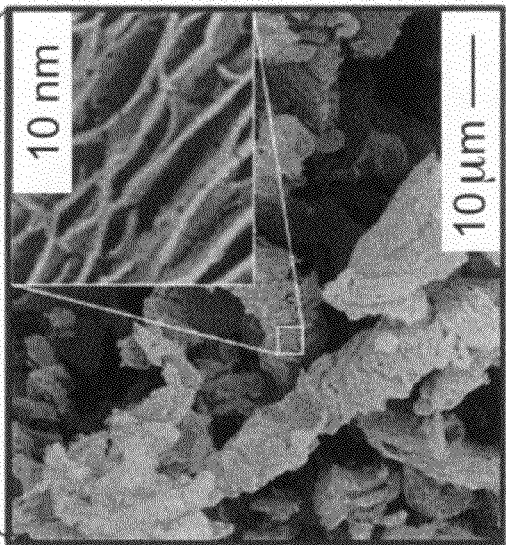
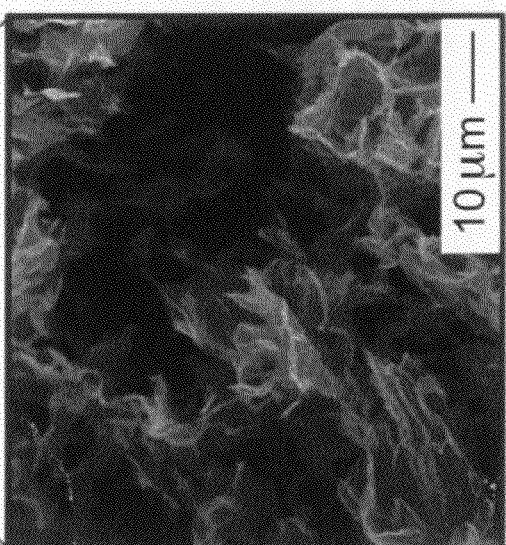
FIG. 3C
FIG. 3D

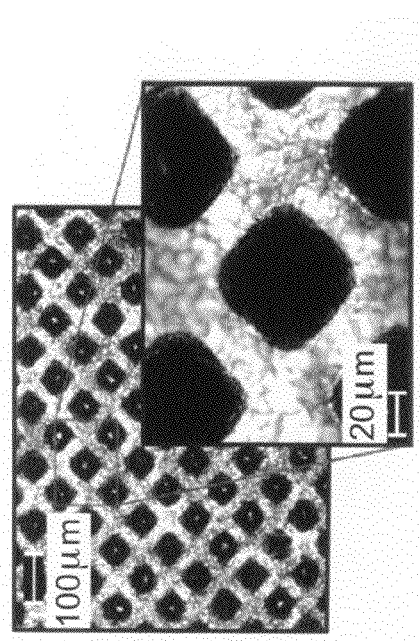
FIG. 6A
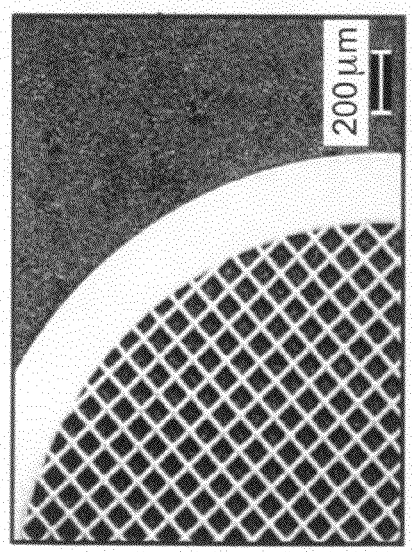
FIG. 6B
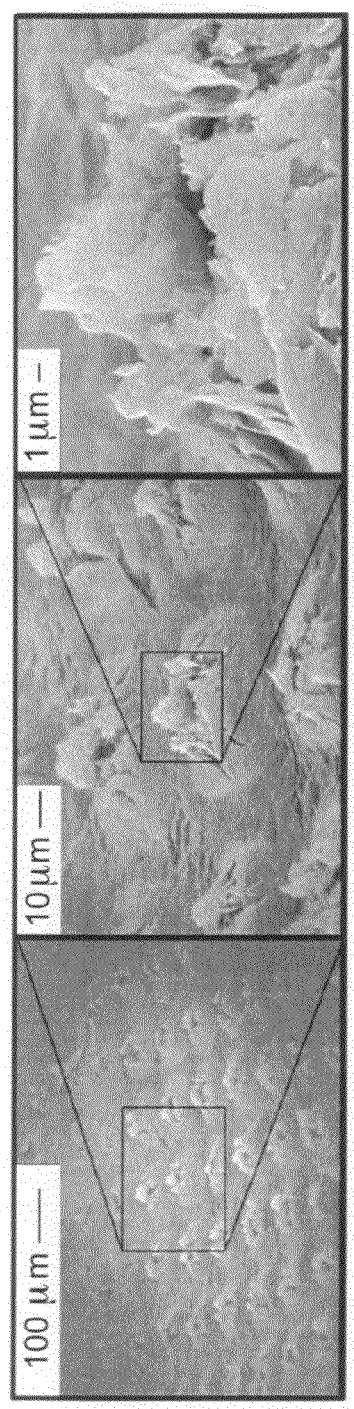
FIG. 7A
FIG. 7B
FIG. 7C

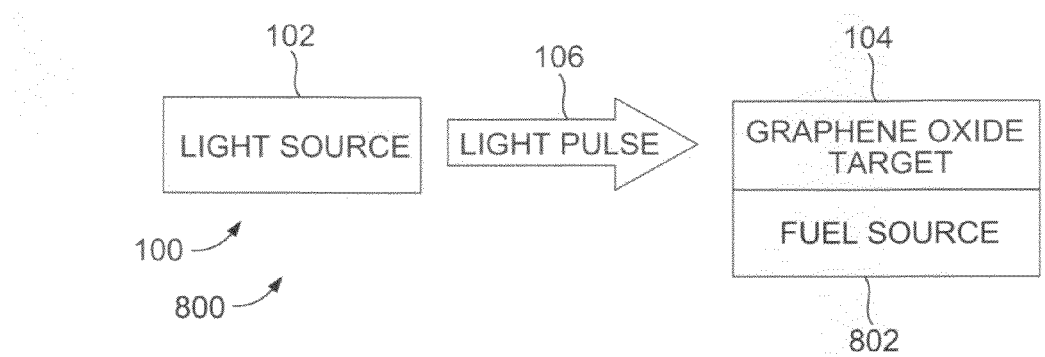
FIG. 8
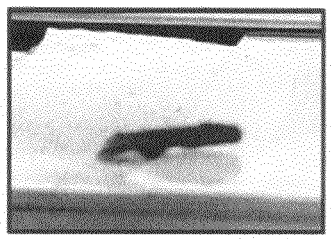 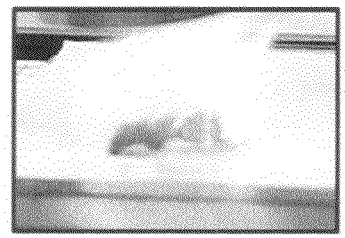 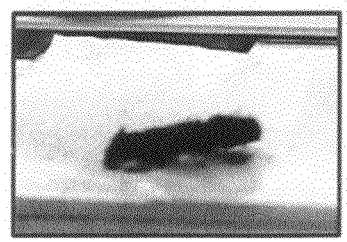
FIG. 9A          FIG. 9B          FIG. 9C

GRAPHENE OXIDE DEOXYGENATION

TECHNICAL FIELD

The invention relates generally to graphene and more particularly to reduction of graphene oxide to obtain graphene

BACKGROUND

Graphene is a single layer of carbon atoms with many useful properties. Graphene may be obtained from graphite by mechanical exfoliation, by epitaxial growth, and reduction of either silicon carbide or graphene oxide. One method of reducing graphene oxide to obtain graphene uses hydrazine, however, hydrazine is highly toxic and unstable. Another method of reducing graphene involves heating graphene oxide to high temperatures (>1000° C.) in an argon atmosphere. Due to the costs and danger associated with these production methods of graphene, it is desirable to find a method of reducing graphene oxide without requiring hydrazine, high temperatures, or an inert gas atmosphere.

SUMMARY

The invention in one implementation encompasses a method. A graphene oxide (GO) target is exposed to light having power sufficient to initiate a deoxygenation reaction of the GO target. The deoxygenation reaction of the GO target transforms the GO target to graphene.

Another implementation of the invention encompasses an apparatus. The apparatus comprises a graphene oxide (GO) target and a light source remotely located from the GO target. The light source is configured to emit a light pulse, directed at the GO target, with sufficient power to initiate a deoxygenation reaction in the GO target.

DESCRIPTION OF THE DRAWINGS

Features of example implementations of the invention will become apparent from the description, the claims, and the accompanying drawings in which:

FIG. 3 is a representation of a sample of graphene oxide foam before and after deoxygenation.

FIG. 6 is a representation of a graphene oxide film before (a) and after (b) deoxygenation.

FIG. 7 is a representation of a series of images of the deoxygenated film of FIG. 6.

FIG. 8 is a representation of another implementation of the apparatus of FIG. 1 and illustrates a fuel source adjacent to the graphene oxide target.

FIG. 9 is a representation of an ignition of ethanol vapor from flashing a graphene oxide foam.

DETAILED DESCRIPTION

Figure 1:
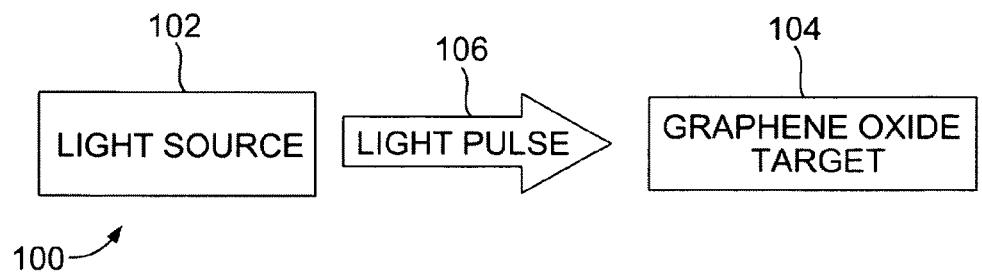
FIG. 1 is a representation of one implementation of an apparatus that comprises a light source that emits a light pulse towards a graphene oxide target.

Turning to FIG. 1, an apparatus 100 in one example comprises a light source 102 and a graphene oxide (GO) target 104. Graphene oxide (GO) is a deeply colored, water dispersible, oxidized form of graphene obtained through the treatment of graphite powder with powerful oxidizing agents. The light source 102 is configured to expose the GO target 104 to light, for example, to emit a light pulse 106 directed at the GO target 104. Examples of the light source 102 comprise lasers, flash bulbs or lamps, arc lamps, electroluminescent lamps (e.g., light emitting diodes), gas discharge or electric glow discharge lamps (e.g., xenon flash lamps, neon and argon lamps), high-intensity discharge (HID) lamps (e.g., xenon arc lamps, mercury-vapor lamps, metal halide lamps), other sources of light, or combinations thereof.

The light source 102 is configured such that the characteristics of the light pulse 106 are sufficient to initiate a deoxygenation reaction in the GO target 104. In one example, the light pulse 106 causes an ignition or photothermal decomposition of the GO target 104, which reduces the graphene oxide into graphene (e.g., conducting graphene), as will be appreciated by those skilled in the art. In one example, multiple light pulses are used to cause the ignition at multiple locations of the GO target 104. Characteristics of the light pulse 106 that affect the deoxygenation reaction of the GO target 104 comprise light frequency (e.g., ultraviolet, visible, infrared), intensity, and duration. The light pulse 106 in one example comprises a single dominant frequency, such as a light pulse from a laser. In alternate embodiments, the light pulse 106 comprises a plurality of frequencies, such as a light pulse from a camera flash.

In one example, light pulse 106 comprises wavelengths between 200 nanometers and 400 nanometers In a further example, the light pulse 106 comprises wavelengths that coincide with an absorption peak of GO at approximately 231 nanometers. Longer wavelengths are also effective for initiating the reaction, but the GO has a lower absorption of energy at these larger wavelengths. The pulse duration for the light pulse 106 in one example comprises a range of approximately 10 micro-seconds to 50 milliseconds. Longer or shorter durations are possible and depend on the other characteristics of the light pulse 106 and the absorption by the GO target 104.

A total integrated energy of the light pulse 106 in one example increases as the pulse duration decreases. For example, a shorter pulse corresponds to a pulse of greater power for an improved initiation of the reaction. Initiation of the reaction in one example is based on heat transfer within the GO target 104. For example, the light pulse 106 is configured to heat the GO target 104 to approximately 200° Celsius.

The light source 102 in one embodiment is configured to directly expose the GO target 104 with the light pulse 106. In alternative embodiments, the light source 102 comprises one or more lenses, shutters, mirrors, masks, optical fibers, optical circuits or devices, or combinations thereof. In a first embodiment, the light source 102 comprises a plurality of individual light sources, the light from which is combined and focused to provide the light pulse 106. In a second embodiment, the light source 102 comprises a pulsed laser source. In a third embodiment, the light source 102 comprises a continuous light source (e.g. continuous wave laser) with a high-speed shutter to provide the light pulse 106. In a fourth embodiment, the light source 102 comprises a digital micromirror device or other optical semiconductor to provide the light pulse 106. For example, the digital micromirror device redirects light towards or away from the GO target 104 to create the light pulse 106. In a fifth embodiment, the light source 102 comprises a photolithographic light source.

The GO target 104 comprises a surface area and/or density sufficient for initiation of the deoxygenation reaction. In a first embodiment, the GO target 104 comprises a porous graphene oxide (GO) structure, for example, a porous material or powder. In one example, a porous GO structure is created by drying a dispersion of graphene oxide. Examples of drying techniques comprise freeze-drying the dispersion or drying the dispersion with $P_2O_5$ powder under vacuum. Drying under vacuum may take several days to achieve a desired form of the graphene oxide for ignition. The dispersion of graphene oxide in one example comprises a density approximately between 5 milligrams and 15 milligrams of graphene oxide per milliliter of water (e.g., 1%±0.5% concentration).

In a second embodiment, the GO target comprises a thin film of graphene oxide. The thin film of graphene oxide in one example is formed with a thickness approximately between 1 nanometer and 20 microns. In one example, a thin film is created by filtering a dispersion of graphene oxide. One example of a suitable filter is a membrane filter, such as a 0.22 micron Anapore™ filter ($Al_2O_3$). For example, the dispersion is filtered and the resulting film is peeled off of the filter. In alternative embodiments, methods such as spin coating, spray coating, and slowly evaporating a solvent with graphene oxide may be used to create the thin film. Since graphene oxide is solution processable like a polymer, methods for creating thin films of polymers from a solution can be adapted to create graphene oxide films, as will be appreciated by those skilled in the art.

Figure 2:
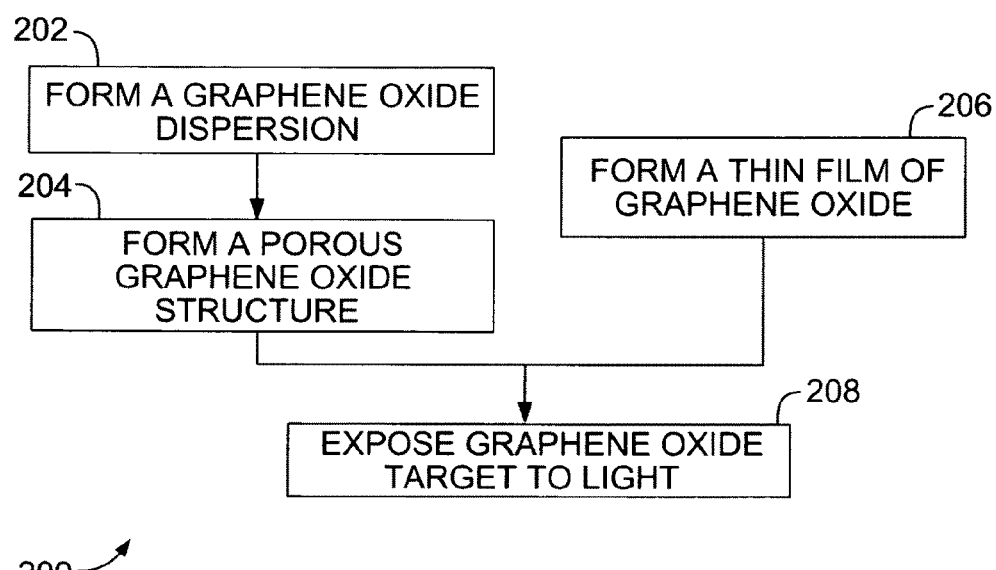
FIG. 2 is a representation of one process flow for initiating a deoxygenation reaction of the graphene oxide target of FIG. 1.

An illustrative description of operation of the apparatus 100 is presented, for explanatory purposes. Turning to FIG. 2, a process flow 200 illustrates ignition of the GO target 104. A GO target 104 is formed in either of two paths. In one embodiment, the GO target 104 comprises a porous graphene oxide (GO) structure. The porous GO structure is created by first forming (STEP 202) a graphene oxide dispersion. The graphene oxide dispersion is then formed (STEP 204) into the porous GO structure, for example, by drying the dispersion. In another embodiment, the GO target 104 is formed (STEP 206) by creating a thin film of graphene oxide. The GO target 104 is then exposed (STEP 208) to the light pulse 106 from the light source 102. The GO target 104 absorbs photons from the light pulse 106 which initiates the deoxygenation reaction in the GO target 104. In one example, the light pulse 106 is only needed to initiate the deoxygenation reaction and the reaction propagates through the GO target 104 without further action.

The deoxygenation reaction of the GO target 104 in one example comprises a reduction reaction that propagates through the GO target 104. The reduction transforms the GO target 104 into graphene, as will be appreciated by those skilled in the art. Since the reduction is initiated by the light pulse 106, STEP 208 can be performed over a wide range of conditions, including but not limited to room temperature, standard temperature and pressure (STP), and under vacuum. In addition, the deoxygenation reaction of the GO target 104 can be initiated from a remotely located light source 102. A maximum range for triggering the deoxygenation reaction is dependent on the characteristics of the light source 102 and transmission medium (e.g., optical fiber, air, vacuum, outer space) that the light pulse 106 must travel through to reach the GO target 104. In one example, the light source 102 comprises a heat lamp placed approximately 1 meter from the GO target 104.

Numerous alternative implementations of the present invention exist. In one embodiment, the light source 102 comprises a photolithographic light source. The photolithographic light source forms the graphene into a desired pattern and allows creation of micro- or nano-scale patterns or features. In one example, the thin film of graphene oxide is formed on a substrate. The substrate in one example comprises a catalytic material, such as a substrate of nickel, copper, silicon, or magnesium. In this example, the substrate/catalytic material scavenges oxygen during the reaction of the graphene oxide which results in a larger quantity of the crystalline graphene. Alternate catalytic metals or materials are also possible, for example, those with an oxide that is more thermodynamically stable (i.e., has a lower Gibb's free energy) than $CO_2$. Deoxygenation of $CO_2$ to carbon black in the presence of magnesium metal creates MgO. Since the deoxygenation reaction initiated by the light pulse 106 creates $CO_2$, the presence of magnesium as a catalyst (e.g., in powder form or as a substrate for a GO film) in one example increases the graphene yield of the deoxygenation reaction of the GO target 104, due to the uptake of oxygen by the magnesium to create MgO.

Alternative patterns or designs may be achieved with other known light-patterning or manipulation techniques, such as optical circuits and/or digital micromirror devices. Due to the electrically conductive nature of the graphene, electrical circuits may be patterned with the reduced graphene.

In another embodiment, catalysts may be mixed or added to the GO target 104. For example, an oxygen scavenging catalyst such as nickel, copper, silicon, or magnesium may scavenge oxygen during the deoxygenation reaction of the graphene oxide. This also results in a larger quantity of the crystalline graphene, as will be appreciated by those skilled in the art.

Turning to FIG. 3(*a*), a representation of a light brown graphene oxide foam sample is shown. The GO foam sample was prepared by freeze drying a 15 mg/ml dispersion to achieve a density of 15 mg/cm³. A scanning electron micrograph (SEM) of the GO foam sample at 1000× magnification shows the porous nature of the foam in greater detail in FIG. 3(*b*). In the SEM image, the GO platelets appear as crumpled sheets ranging in size from approximately 500 nm-20 µm in diameter, that assemble to form a porous 3-dimensional network. Trace amounts of water adhered to the surface of the GO sheets most likely hold the sheets together giving the foams some rigidity.

The porous structure results from the drawing off of water without causing collapse of the solid matrix of GO platelets due to capillary action, as would happen with conventional evaporation. Creating dry, low-density networks of nanoscale GO platelets serves two purposes: first the surface to volume ratio of the platelets is increased providing maximum surface area for energy absorption. Second, thermally conductive pathways through which absorbed energy could be diffused are reduced. GO foam networks enable greater energy absorption and confinement can be achieved; as a result, more rapid and dramatic temperature increases can be achieved. It was found that using freeze-drying, porous GO foams could be made to densities of nominally 5 mg/cm³ before the structures would collapse under their own weight.

Upon exposure to a photographic flash, the GO foam emits a popping sound most likely attributed to a photoacoustic effect. A color change from light brown to dark black can be witnessed immediately after flashing indicating conversion to deoxygenated graphitic carbon (DGC). After deoxygenation (e.g., "flashing"), the GO foam ignites, releasing $CO_2$ and $H_2O$ as the major products with some CO and leaving behind an exfoliated, deoxygenated graphitic carbon (DGC) material as depicted in FIG. 3(*c*). The light brown spots around the periphery of the sample indicate unreacted regions at the edges of the sample as a result cooling and expansion of the foam as the reaction front propagated. An SEM image of the DGC material shows exfoliated layers in FIG. 3(d). This indicates an expanded structure much like that of exfoliated graphite, or more recently thermally reduced GO, termed functionalized graphene sheets (FGS). Under high magnification (inset of FIG. 3(d); 100,000×), the expanded nature of the flashed converted graphitic platelets is shown and a thickness of the thinnest expanded sheets is estimated to range from 10-20 nm.

Figure 4A:
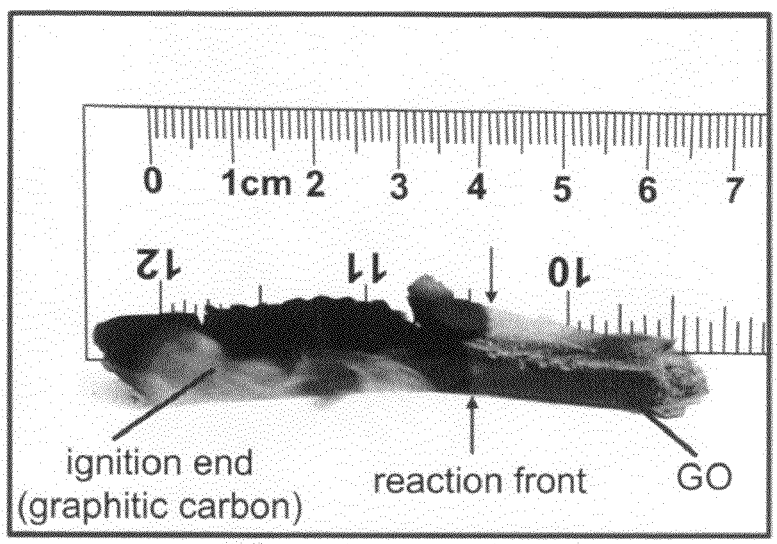
FIG. 4 is a representation of a reaction front (a) of a graphene oxide foam target during propagation and samples of amorphous carbon (b) and (c).
Figure 4B:
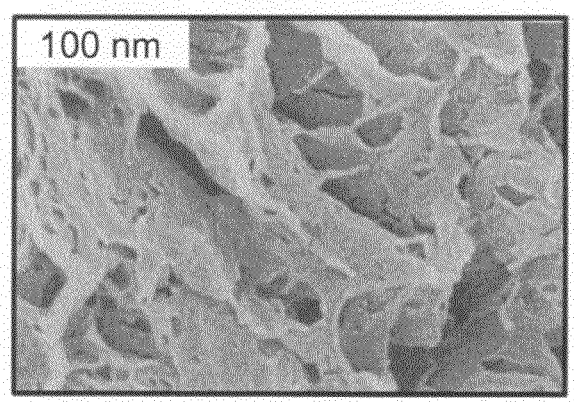
Figure 4C:
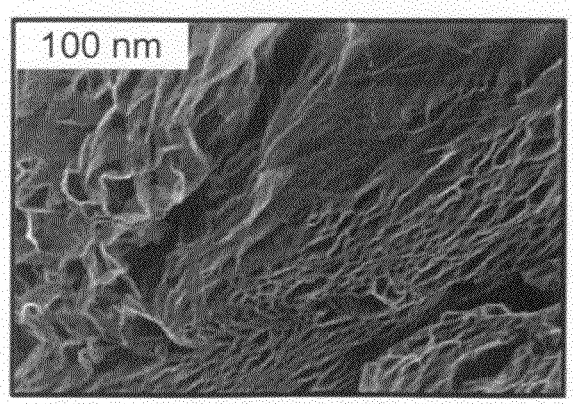

Turning to FIG. 4, a representation of a 15 mg/ml GO foam sample after photoignition (FIG. 4(a)) shows a propagation of the reaction front from left to right after having photothermally ignited the sample on the left end. The light brown area on the right side of the sample is unreacted GO. Analysis of movie frames taken indicate that the reaction front moves through the sample at a rate of approximately 10 cm/sec. When exposing the GO foam samples to the flash, we found the ease of ignition and reaction propagation to be influenced by the density of the GO foam. Denser GO foams (>50 mg/cm$^3$) were typically more difficult to ignite requiring several flashes at close range (<1 mm) in order to initiate a reaction. The lower density GO foams (<5 mg/cm$^3$) although easier to ignite, did not produce enough heat via deflagration to sustain a reaction front, and thus were not self-propagating. Once ignited however, a reaction front would move through the GO foam structure releasing $CO_2$ and $H_2O$ as it moved.

GO foams can be flashed while being contained in an evacuated flask or under inert argon atmosphere by flashing through the transparent glass of a round bottom flask. In both cases the GO foams ignited and the reaction propagated through the bulk of the foam, demonstrating that the deflagration of GO did not require outside oxygen to propagate. GO foams flashed in open atmosphere typically burn in atmospheric oxygen after deflagration, which appears to yield amorphous carbon at the edges, as shown in the SEM image of FIG. 4(b). The amorphous carbon can be attributed to secondary burning of the newly formed graphitic carbon in atmospheric oxygen after the removal of $H_2O$ and $CO_2$ from the primary deflagration reaction. If flashed under an inert gas atmosphere, such as argon, the GO foam does not burn in atmospheric oxygen after release of $CO_2$ and $H_2O$, which results in a more pure exfoliated sample with a fine expanded structure, shown in FIG. 4(c).

Figure 5A:
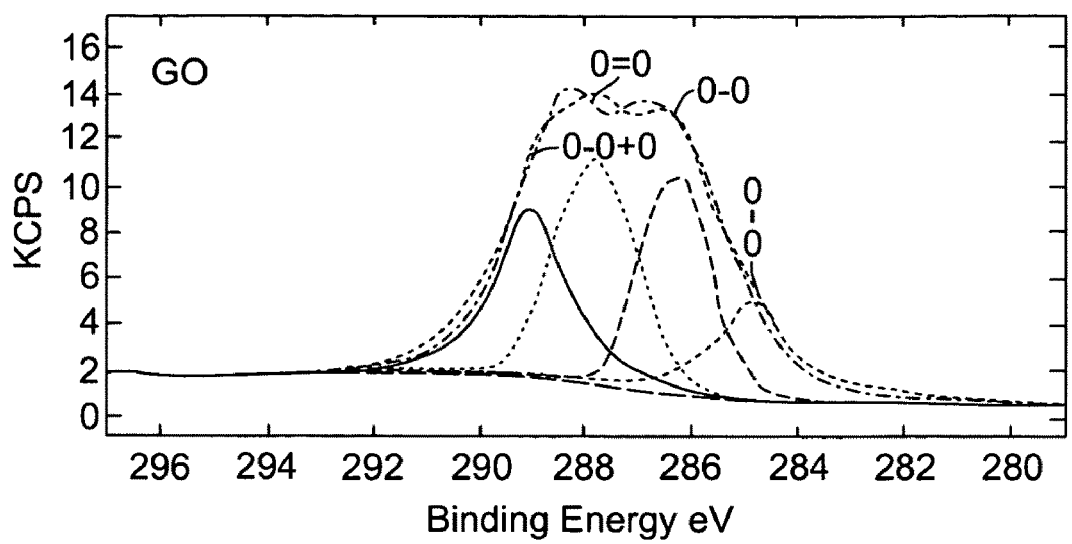
FIG. 5 is a representation of an X-ray photoelectron spectroscopy spectrum of graphene oxide before (a) and after (b) deoxygenation, and several dispersions of deoxygenated graphitic carbon.
Figure 5B:
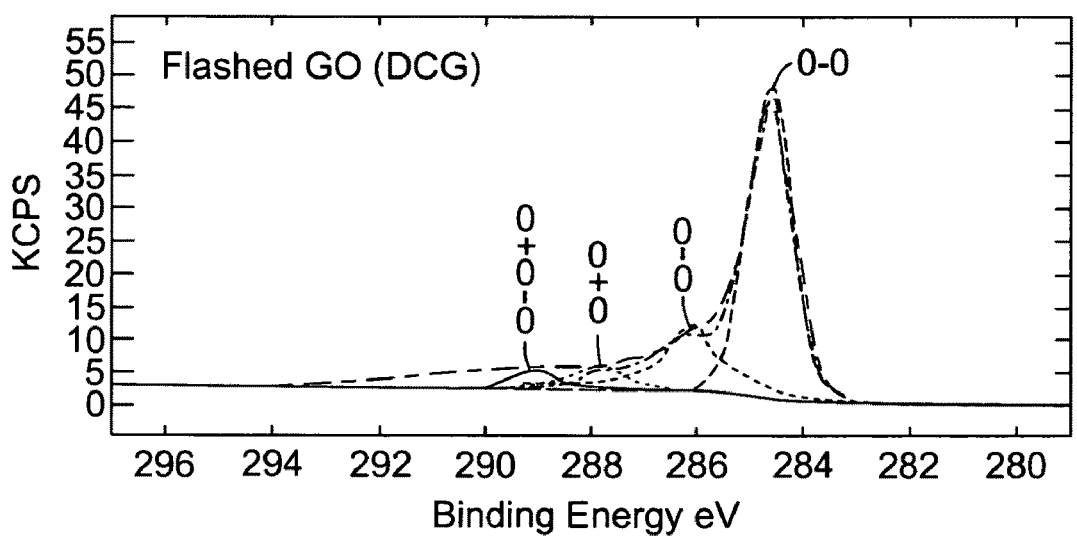

Turning to FIG. 5, the DGC material that remained after photothermally induced deoxygenation was analyzed for carbon and oxygen content using X-ray photoelectron spectroscopy (XPS). The carbon and oxygen content change from 68.7% and 29.3% respectively for the GO starting material (FIG. 5(a)), to 92.1% and 7.7% after flashing (FIG. 5(b)). The remaining oxygen is most likely due to residual fimctionality due to incomplete deoxygenation. The residual functionality left behind after incomplete deoxygenation allows the DGC sheets to be dispersed into a variety of polar aprotic organic solvents. Upon flashing, the GO foam underwent an average mass loss of 70%. Repeated flashing of the expanded DGC material resulted in continued photoacoustic popping sounds and a measurable reduction in mass for each flash exposure. We speculate that the added energy from repeated flashing caused the mostly converted DGC material to continue oxidizing to $CO_2$. X-ray powder diffraction of a compressed pellet of the DGC shows a broad, low-intensity peak centered at 26.4° 2θ indicating that after deflagration the product is—in fact—graphitic in nature. The peak broadness is most likely due to both the small crystalline domain sizes of the graphitic planes and the turbostatic nature of the expanded sheets.

Figure 5C:
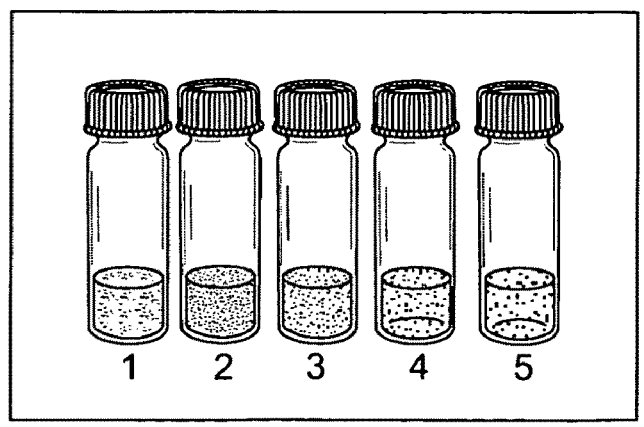

Resistivity measurements of the DGC yield a reduction in resistance from $9.6 \times 10^5 \Omega \cdot cm$ ($1.0 \times 10^{-3}$ S/m) for the GO starting material to $2.45 \Omega \cdot cm$ (40.7 S/m) still too high (low) after reduction. This four order of magnitude resistivity change is consistent with other forms of thermally reduced GO. Due to the expanded nature of the flashed GO foams (DGC), they were analyzed for surface area by measuring $N_2$ uptake using the Braunaur Emmett-Teller (BET) analysis method. Before flashing, a GO foam with a density 15 mg/cm$^3$ was measured to have a surface area of 6 m$^2$/g. After flashing, the measured surface area yielded a range from 400 m$^2$/g to 980 m$^2$/g. We believe the large range in values can be attributed to difficulties in determining the sample weight and adsorbed water. Hydrogen uptake of the flashed DGC was performed resulting in an uptake of 1.75% at room temperature. The DGC obtained from flashing GO was found to be dispersible in several aprotic polar organic solvents including: (1) n-methylpyrolidone (NMP), (2) dimethylfomamide (DMF), (3) tetrahydrofuran (THF), (4) nitromethane, and (5) acetonitrile as shown in FIG. 5(c).

In addition to GO foam materials, the photothermal conversion of GO to DGC is applicable to the flashing of GO films. Thin GO films (<1 μm in thickness) were created by filtering a dilute GO dispersion through a thermally insulating, 0.2 μm nylon Millipore™ filter. Turning to FIGS. 6-7, an optical microscope image of a GO film obtained via filtration along with a Cu transmission electron microscopy (TEM) grid before flashing is shown in FIG. 6(a). Using the TEM grid as a mask, the pattern of the TEM grid is transferred to the GO film as shown in the optical microscope images in FIG. 6(b). The exposed regions turn a dark black in contrast to the masked GO film. The deoxygenation and subsequent release of $CO_2$ and $H_2O$ blow the platelets of DGC out from the surface, as depicted in the series of SEM images in FIGS. 7(a), (b), and (c).

Nanoparticles composed of high extinction coefficient materials are able to achieve dramatic temperature increase upon exposure to short pulses of moderate intensity light. These temperatures increases occur as a consequence of the increased the surface to volume ratio and decreased the number of the thermally conducting pathways by which to remove absorbed light energy. One of the distinguishing characteristics that sets photothermal ignition of GO apart from the flashing of other nanomaterials, is that instead of merely igniting or melting a material, we are able to initiate the exothermic decomposition reaction. The benefit of this is that the energy required for ignition is not provided solely by the flash light source as it would be with other nanomaterials. This enables the use of lower power light sources and/or larger particles in order to achieve ignition since the particles themselves add energy to the system. In patterning applications, the solubility differences between GO and DGC can be used to quickly separate exposed and masked regions of a thin GO film. Using an organic solvent the broken-up flashed areas of a GO film could be washed, leaving the masked GO portions intact. Subsequent thermal or chemical reduction of the patterned GO films to conducting, reduced GO would make it possible to create highly conducting patterns.

Turning to FIG. 8, an apparatus 800 shows another embodiment of the apparatus 100 with a fuel source 802 located adjacent to the GO target 104. In this embodiment, heat generated by the reduction reaction of the graphene oxide is transferred, conducted, or otherwise absorbed by the fuel source 802. The fuel source 802 comprises an ignition temperature that is low enough to be ignited by the heat from the reduction of the GO target 104. In one example, the fuel source 802 is a rocket fuel. In alternative embodiments, the GO target 104 is formed of GO platelets which are mixed with or dispersed within the fuel source 802.

By dispersing GO platelets to a liquid fuel, it is possible to initiate ignition of the fuel using a flash of light as opposed to a spark plug. Illumination of a fuel/oxidizer mixture would enhance combustion by allowing ignition to occur at numerous locations simultaneously. One of the major drawbacks of an electrical spark is that it is a single-point ignition source. Ideally, multiple ignition nucleation sites allow for more controllable, more efficient and more reliable ignition and combustion. This is useful for applications such as liquid fueled rockets, where current ignition methods are known to possess one or more disadvantages. Issues such as combustion instability and start-up transients not only can cause severe damage, but also degradation in engine efficiency and increase emission of pollutants. It is thought that nearly 30% of the combustion instabilities in rocket engines, leading to engine damages and possible loss of cargo and human life, can be traced back to the nature of the propellant initial energy release process.

In previous tests using single wall carbon nanotubes (SWNTs) as photo-ignition enabling additives to fuels, the SWNTs were found to only ignite in the presence of ambient oxygen and did not disperse well in test fuels. Flashing of SWNTs is also heavily dependent on iron catalyst concentration. Since it carries its own supply of oxygen and is highly dispersible in fuels such as alcohol, GO may be used as an ignition promoter for fuels. In our preliminary experiments, we have been able to successfully ignite ethanol fuels using GO as a photothermal initiator. Turning to FIGS. 9(*a*), (*b*), and (*c*), a series of images shows a sample of GO foam with ethanol vapor being passed over it. After flashing (FIG. 9(*b*)), the ethanol readily ignited as a result of the GO ignition. After the ethanol fuel is consumed, we can see the DGC glowing bright red as a result of the combustion reaction in FIG. 9(*c*). Pyrometer readings of this ignition process indicate that by flashing GO we are able to achieve temperatures of 400-500° C.

Over the last decade, extraordinary effort has been undertaken to both improve the fuel efficiency in traditional gasoline engines and search for clean, renewable alternatives fuel alternatives to gasoline. One of the ideas that has surfaced from this thrust, is the notion of a homogeneously charge compression ignition (HCCI) engine that combines the high efficiency of a diesel engine with the low emissions of a spark ignition (SI) engine. In a typical HCCI engine, fuel and air are mixed homogeneously similar to a SI engine, but ignition occurs by means of an autoignition under high compression similar to a diesel engine. The high compression ratio of HCCI engines provides an efficiency increase of up 15% over current SI engines. Currently, one of the major challenges facing HCCI has been controlling the unpredictable compression-induced ignition process. By using an ignition promoter such as graphene oxide, it could be possible to achieve distributed ignition in HCCI engines providing accurate ignition timing resulting in homogeneous detonation of fuel and air.

The apparatus 100 in one example comprises a plurality of components such as one or more of electronic components, hardware components, and computer software components. A number of such components can be combined or divided in the apparatus 100. An example component of the apparatus 100 (e.g., the light source 102) employs and/or comprises a set and/or series of computer instructions written in or implemented with any of a number of programming languages, as will be appreciated by those skilled in the art.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method, comprising the step of:
   exposing a porous graphene oxide (GO) target to a light pulse having power and duration sufficient to initiate a deoxygenation reaction of the GO target, wherein the deoxygenation reaction of the GO target transforms the porous GO target to graphene and the porous GO target comprises sufficient surface area for propagation of the deoxygenation reaction.

2. The method of claim 1, further comprising the step of preparing the porous GO target by drying a dispersion of graphene oxide to form a porous GO structure.

3. The method of claim 2, wherein the step of drying comprises the step of:
   freeze-drying the dispersion of graphene oxide to form the porous GO structure.

4. The method of claim 2, further comprising the step of:
   forming the dispersion of graphene oxide with a graphene oxide density approximately between 5 milligrams and 15 milligrams of graphene oxide per milliliter.

5. The method of claim 1, wherein the deoxygenation reaction of the GO target is a photothermal decomposition of the GO target.

6. The method of claim 1, further comprising the step of:
   mixing the porous GO target with an oxygen-scavenging catalyst that scavenges oxygen during the deoxygenation reaction of the GO target.

7. The method of claim 6, wherein the oxygen-scavenging catalyst comprises one or more of nickel, copper, silicon, or magnesium.

8. The method of claim 1, further comprising the step of:
   forming the porous GO target as a thin film.

9. The method of claim 8, wherein the step of forming the porous GO target as a thin film comprises the step of:
   forming the porous GO target as a thin film with a thickness approximately between 1 nanometer and 20 microns.

10. The method of claim 8, wherein the step of exposing the porous GO target to light comprises the step of:
    exposing the thin film to light to form the graphene in a desired pattern.

11. The method of claim 10, wherein the step of exposing the thin film comprises the step of:
    exposing the thin film to light from a photolithographic light source to form the graphene in the desired pattern.

12. The method of claim 11, further comprising the step of:
    forming the porous GO target as a thin film onto a catalytic metal substrate, wherein the catalytic metal substrate scavenges oxygen during the deoxygenation reaction of the GO target.

13. The method of claim 1, wherein the step of exposing the porous GO target to light comprises the step of:
    exposing the porous GO target to light with a wavelength between 200 nanometers and 400 nanometers.

14. The method of claim 1 wherein the duration of the light pulse is between 10 μs and 50 ms.

\* \* \* \* \*